US012675518B1

(12) United States Patent
Yuan et al.

(10) Patent No.: US 12,675,518 B1
(45) Date of Patent: Jul. 7, 2026

(54) NATURAL LANGUAGE SUMMARIZATION USING CHAIN OF SOFT-THOUGHT PROMPTING

(71) Applicant: Amazon Technologies, Inc., Seattle, WA (US)

(72) Inventors: Jie Yuan, Bellevue, WA (US); Monica Lakshmi Sunkara, San Jose, CA (US); Katrin Kirchhoff, Seattle, WA (US); Jinglun Cai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 18/540,636

(22) Filed: Dec. 14, 2023

(51) Int. Cl.
　　*G06F 40/40*　　(2020.01)
　　*G06F 16/34*　　(2019.01)
　　*G06F 40/284*　　(2020.01)

(52) U.S. Cl.
　　CPC .......... *G06F 16/345* (2019.01); *G06F 40/284* (2020.01); *G06F 40/40* (2020.01)

(58) Field of Classification Search
　　CPC .............................. G06F 16/345; G06F 40/40
　　See application file for complete search history.

(56) References Cited

U.S. PATENT DOCUMENTS

| | | | |
|---|---|---|---|
| 2025/0028751 A1* | 1/2025 | Yu | G06F 40/35 |
| 2025/0094708 A1* | 3/2025 | Cunningham | G06F 40/30 |
| 2025/0200332 A1* | 6/2025 | Tabacof | G06Q 30/015 |
| 2025/0200635 A1* | 6/2025 | Unnikrishnan | G06Q 30/0204 |

* cited by examiner

*Primary Examiner* — Bryan S Blankenagel
(74) *Attorney, Agent, or Firm* — KNOBBE, MARTENS, OLSON & BEAR, LLP

(57) ABSTRACT

A system may be configured to: receive, via user interaction with a user interface, content and a user request to generate a content summary of the content, wherein the user request specifies the content summary is to be generated according to a categorical description, generate, via a soft-prompt generator, a first soft prompt based on the request and one or more tokens, generate, via a summary generator, a categorical description output based on the first soft prompt and the content, generate, via the soft-prompt generator, a second soft prompt based on the categorical description output and the one or more tokens, transmit the second soft prompt to the summary generator; and generate, via the summary generator, the content summary based on the second soft prompt and the content.

20 Claims, 7 Drawing Sheets

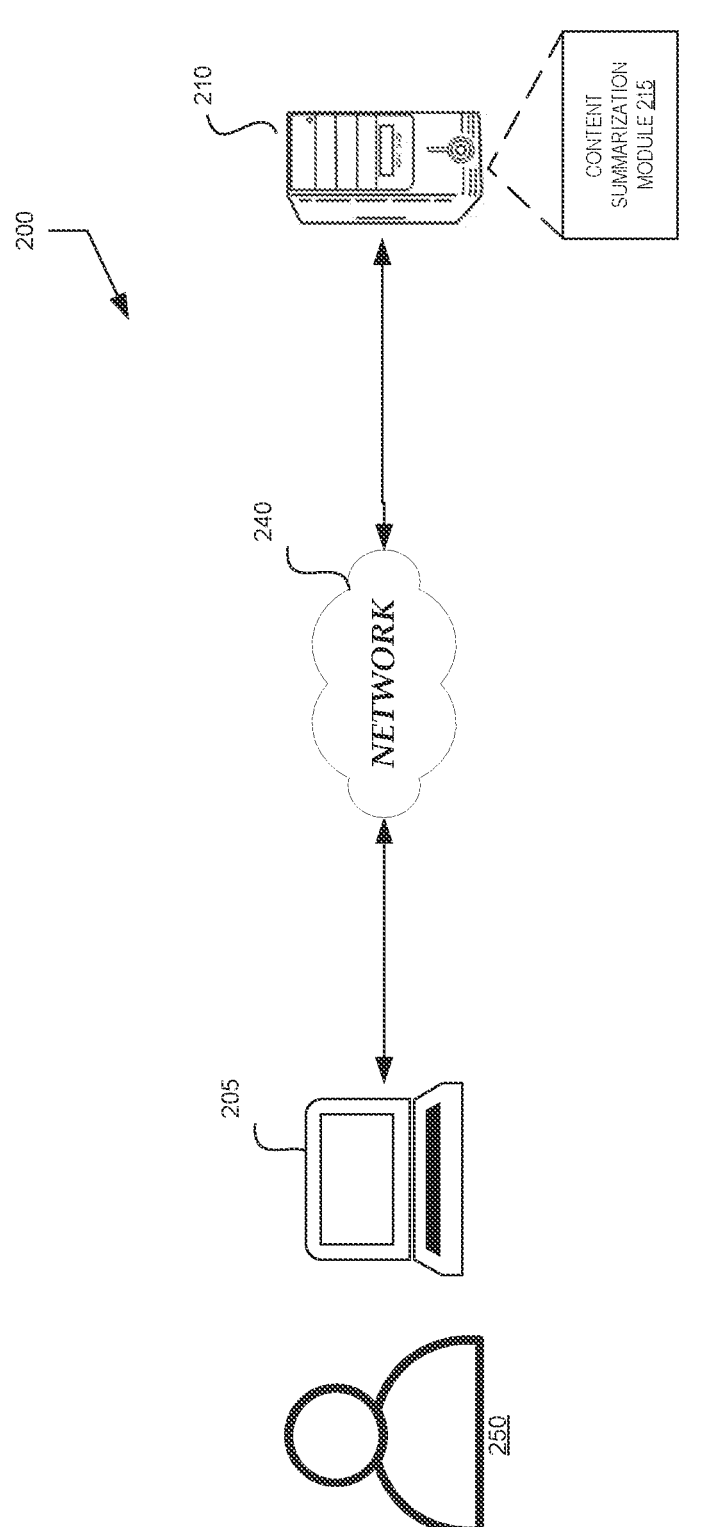
200
210
CONTENT
SUMMARIZATION
MODULE 215
240
NETWORK
205
250
*Fig. 2*

300

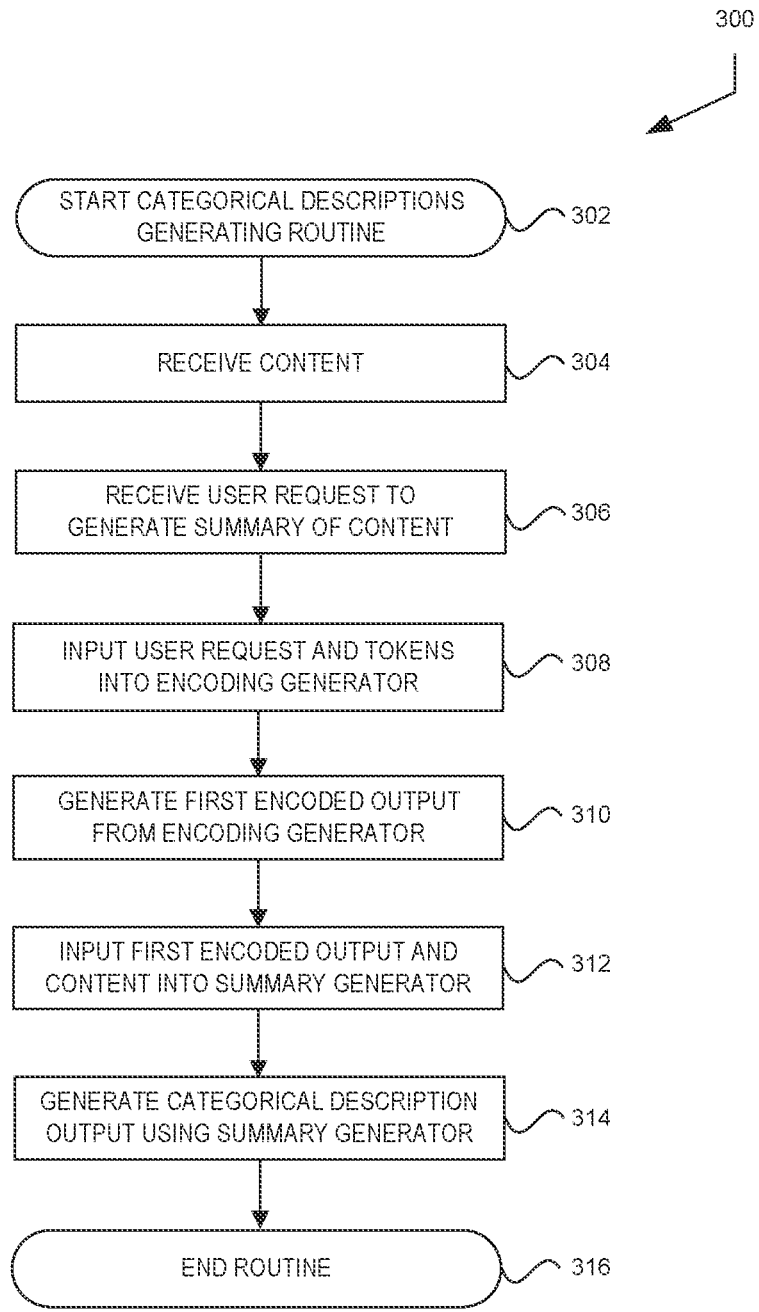

START CATEGORICAL DESCRIPTIONS
GENERATING ROUTINE     302

RECEIVE CONTENT     304

RECEIVE USER REQUEST TO
GENERATE SUMMARY OF CONTENT     306

INPUT USER REQUEST AND TOKENS
INTO ENCODING GENERATOR     308

GENERATE FIRST ENCODED OUTPUT
FROM ENCODING GENERATOR     310

INPUT FIRST ENCODED OUTPUT AND
CONTENT INTO SUMMARY GENERATOR     312

GENERATE CATEGORICAL DESCRIPTION
OUTPUT USING SUMMARY GENERATOR     314

END ROUTINE     316

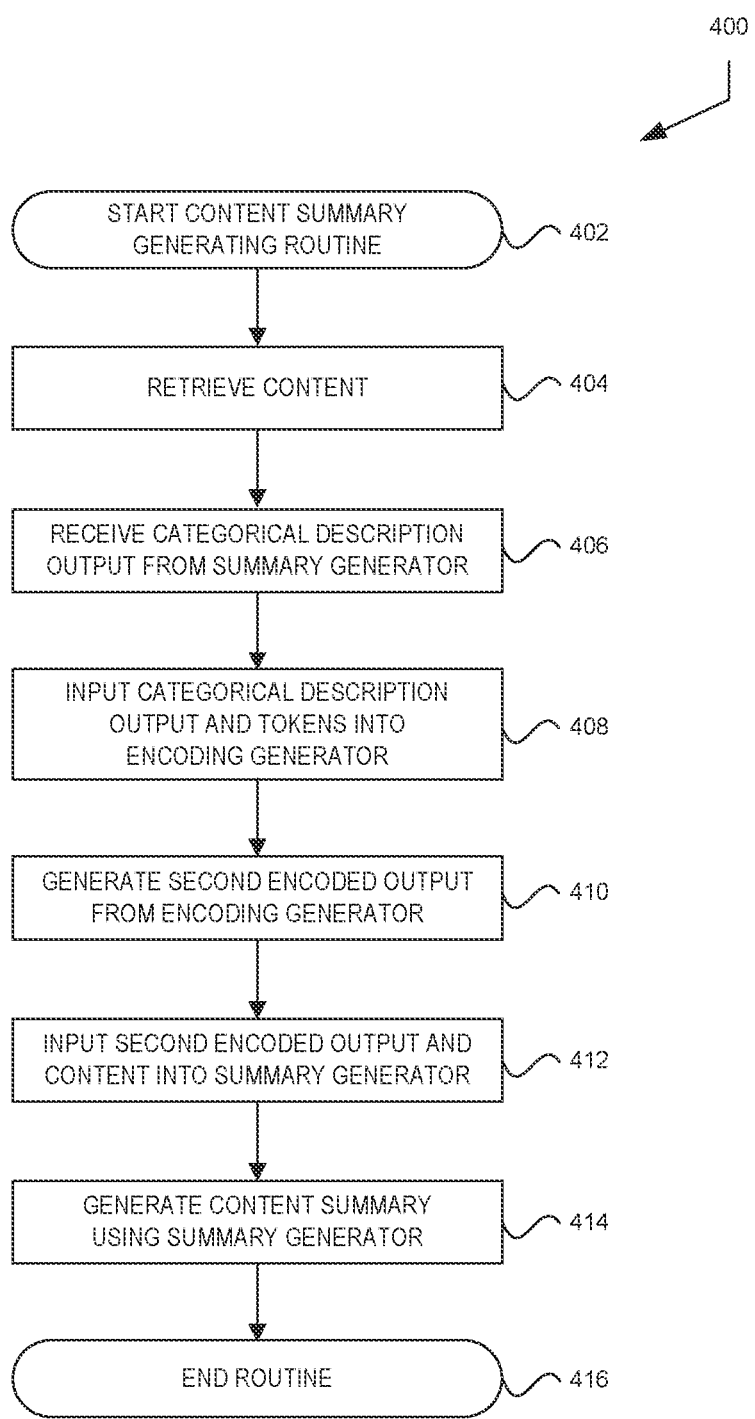

START CONTENT SUMMARY
GENERATING ROUTINE     402

RETRIEVE CONTENT     404

RECEIVE CATEGORICAL DESCRIPTION
OUTPUT FROM SUMMARY GENERATOR     406

INPUT CATEGORICAL DESCRIPTION
OUTPUT AND TOKENS INTO
ENCODING GENERATOR     408

GENERATE SECOND ENCODED OUTPUT
FROM ENCODING GENERATOR     410

INPUT SECOND ENCODED OUTPUT AND
CONTENT INTO SUMMARY GENERATOR     412

GENERATE CONTENT SUMMARY
USING SUMMARY GENERATOR     414

END ROUTINE     416

*Fig. 4*

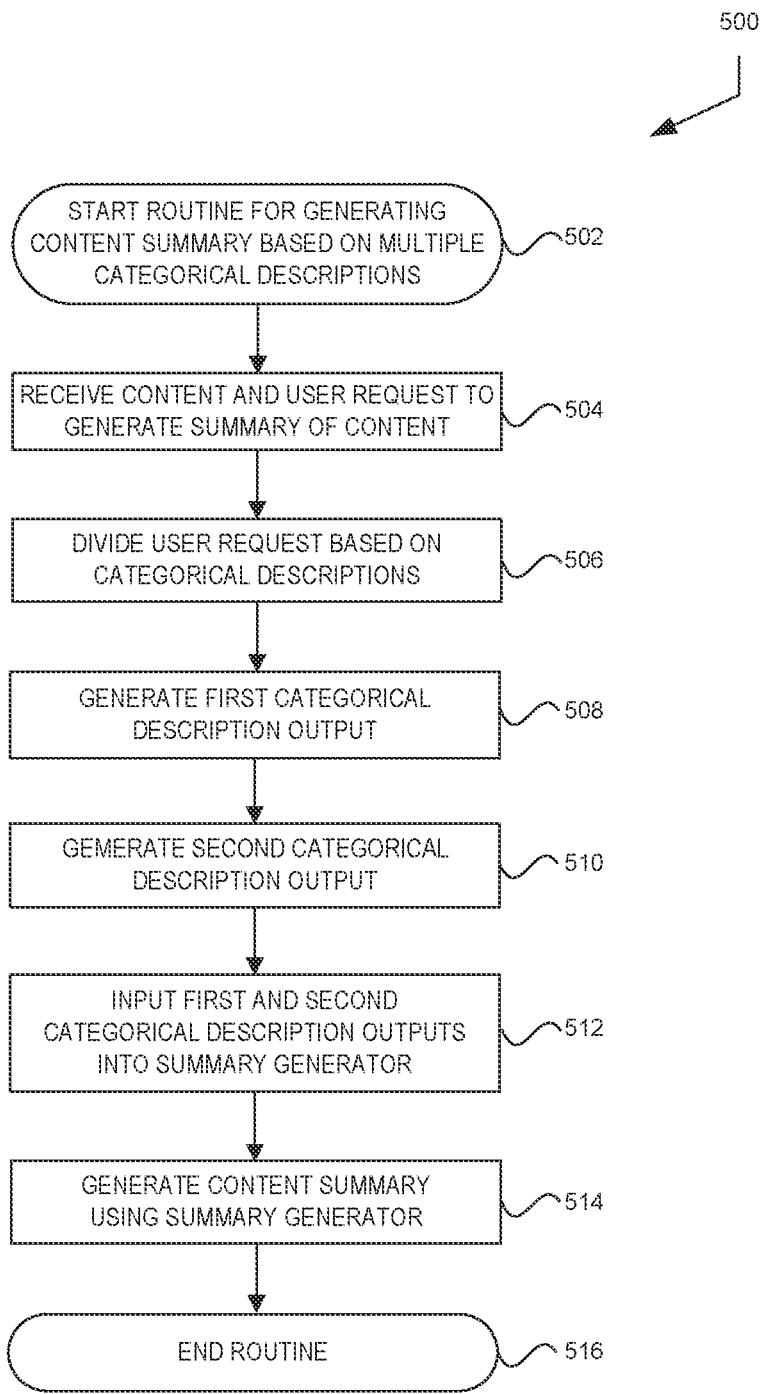

500

START ROUTINE FOR GENERATING CONTENT SUMMARY BASED ON MULTIPLE CATEGORICAL DESCRIPTIONS ⟩⌐502

RECEIVE CONTENT AND USER REQUEST TO GENERATE SUMMARY OF CONTENT ⌐504

DIVIDE USER REQUEST BASED ON CATEGORICAL DESCRIPTIONS ⌐506

GENERATE FIRST CATEGORICAL DESCRIPTION OUTPUT ⌐508

GEMERATE SECOND CATEGORICAL DESCRIPTION OUTPUT ⌐510

INPUT FIRST AND SECOND CATEGORICAL DESCRIPTION OUTPUTS INTO SUMMARY GENERATOR ⌐512

GENERATE CONTENT SUMMARY USING SUMMARY GENERATOR ⌐514

END ROUTINE ⌐516

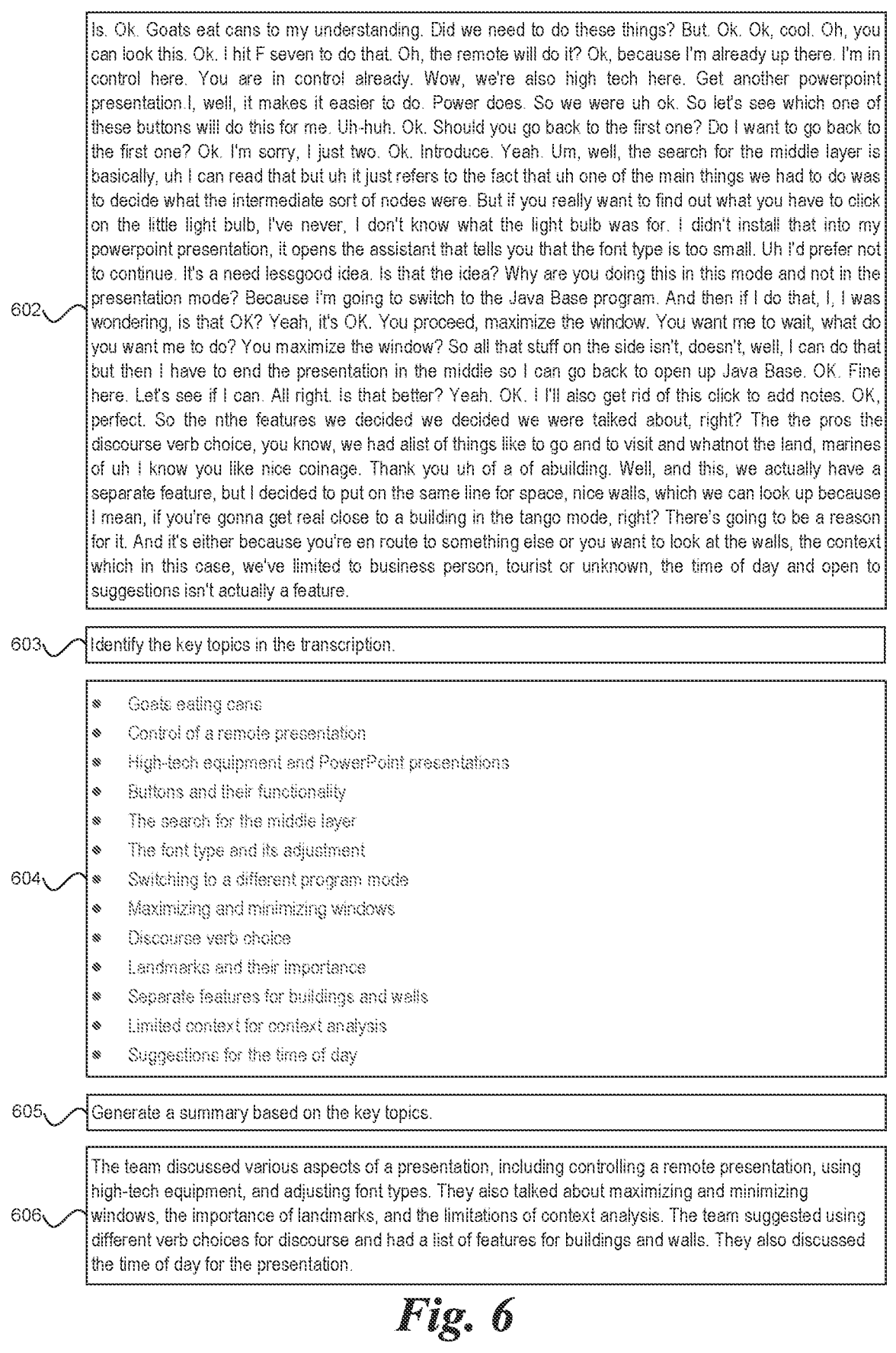

Is. Ok. Goats eat cans to my understanding. Did we need to do these things? But. Ok. Ok, cool. Oh, you can look this. Ok. I hit F seven to do that. Oh, the remote will do it? Ok, because I'm already up there. I'm in control here. You are in control already. Wow, we're also high tech here. Get another powerpoint presentation.I, well, it makes it easier to do. Power does. So we were uh ok. So let's see which one of these buttons will do this for me. Uh-huh. Ok. Should you go back to the first one? Do I want to go back to the first one? Ok. I'm sorry, I just two. Ok. Introduce. Yeah. Um, well, the search for the middle layer is basically, uh I can read that but uh it just refers to the fact that uh one of the main things we had to do was to decide what the intermediate sort of nodes were. But if you really want to find out what you have to click on the little light bulb, I've never, I don't know what the light bulb was for. I didn't install that into my powerpoint presentation, it opens the assistant that tells you that the font type is too small. Uh I'd prefer not to continue. It's a need lessgood idea. Is that the idea? Why are you doing this in this mode and not in the presentation mode? Because I'm going to switch to the Java Base program. And then if I do that, I, I was wondering, is that OK? Yeah, it's OK. You proceed, maximize the window. You want me to wait, what do you want me to do? You maximize the window? So all that stuff on the side isn't, doesn't, well, I can do that but then I have to end the presentation in the middle so I can go back to open up Java Base. OK. Fine here. Let's see if I can. All right. Is that better? Yeah. OK. I'll also get rid of this click to add notes. OK, perfect. So the nthe features we decided we decided we were talked about, right? The the pros the discourse verb choice, you know, we had alist of things like to go and to visit and whatnot the land, marines of uh I know you like nice coinage. Thank you uh of a of abuilding. Well, and this, we actually have a separate feature, but I decided to put on the same line for space, nice walls, which we can look up because I mean, if you're gonna get real close to a building in the tango mode, right? There's going to be a reason for it. And it's either because you're en route to something else or you want to look at the walls, the context which in this case, we've limited to business person, tourist or unknown, the time of day and open to suggestions isn't actually a feature.

603 Identify the key topics in the transcription.

604
- Goats eating cans
- Control of a remote presentation
- High-tech equipment and PowerPoint presentations
- Buttons and their functionality
- The search for the middle layer
- The font type and its adjustment
- Switching to a different program mode
- Maximizing and minimizing windows
- Discourse verb choice
- Landmarks and their importance
- Separate features for buildings and walls
- Limited context for context analysis
- Suggestions for the time of day 605 Generate a summary based on the key topics.

606 The team discussed various aspects of a presentation, including controlling a remote presentation, using high-tech equipment, and adjusting font types. They also talked about maximizing and minimizing windows, the importance of landmarks, and the limitations of context analysis. The team suggested using different verb choices for discourse and had a list of features for buildings and walls. They also discussed the time of day for the presentation.

*Fig. 6*

NATURAL LANGUAGE SUMMARIZATION USING CHAIN OF SOFT-THOUGHT PROMPTING

BACKGROUND

Computing systems can utilize communication networks to exchange data. In some implementations, a computing system can receive and process data provided by another computing system. For example, a computing system can receive data entered using another computing system, store the data, process the data, and so on. Some computing systems execute interactive or unattended applications in which data is processed or other operations are performed in response to user requests or other events.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 2 is a block diagram of illustrative data flows of communication between a user and content summarization system, according to some embodiments.

FIG. 3 is a flow diagram of an illustrative routine for generating categorical descriptions of content, according to some embodiments.

FIG. 4 is a flow diagram of an illustrative routine for generating a content summary, according to some embodiments.

FIG. 5 is a flow diagram of an illustrative routine for generating content summary based on multiple categorical descriptions.

FIG. 6 is an example of content, categorical descriptions of the content, and the content summary generated based on the content and the categorical descriptions.

DETAILED DESCRIPTION

Figure 1:
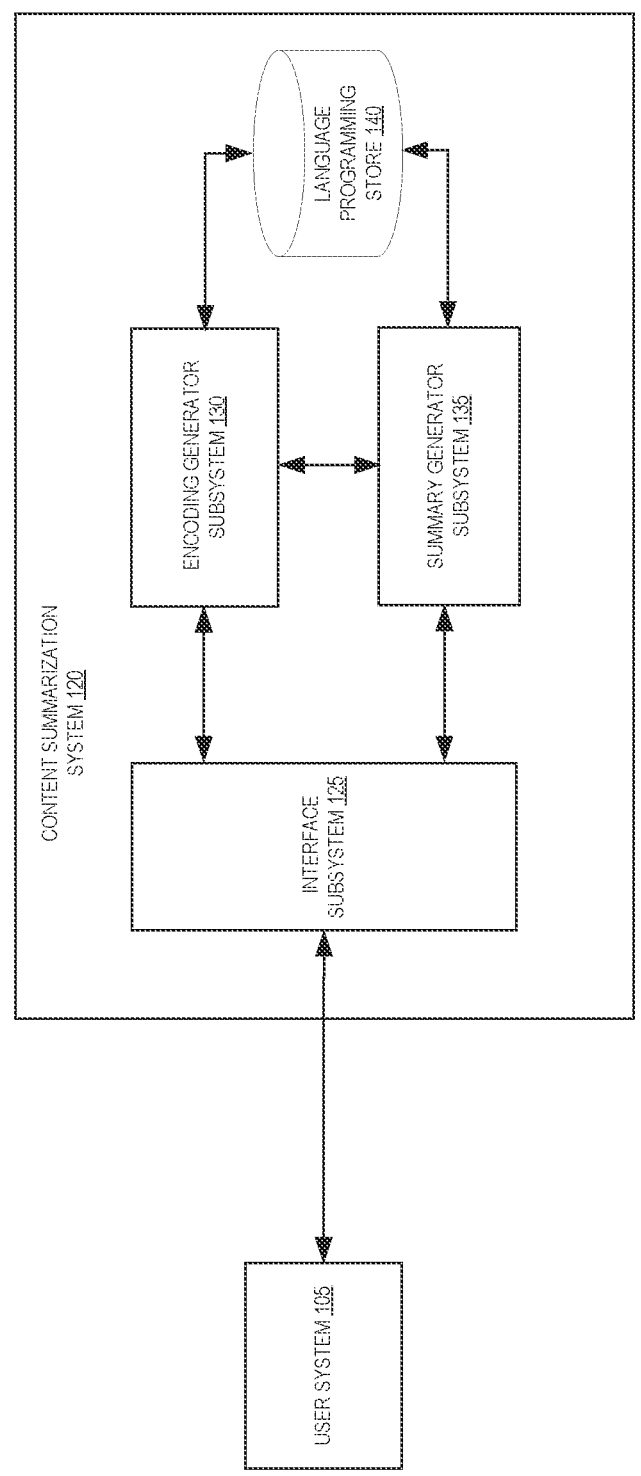
FIG. 1 is a block diagram of illustrative data flows within a content summarization system according to some embodiments.

The present disclosure relates to a content summarization system that generates an accurate summary of content without omitting any information. More specifically, the content summarization system is configured to generate the summary in a manner that is tailored towards a categorical description of the content.

Conventional systems often perform summarization of transcriptions (e.g., spoken language represented in a written format) poorly. More specifically, the summary of the transcription may not capture all of the subject matter (in the transcription) that was discussed, and therefore may include less information than expected. Such missing information may extend to vital or critical information. Consequently, it poses a problem, when users of the conventional system rely on such summaries for remembering discussions. Such users may include those who participated in the dialogue that generated the transcription (e.g., meeting participant) or may be users who did not participate in the dialogue, but nonetheless wishes to obtain summarized information of the dialogue (e.g., intended meeting participant who failed to participate in the meeting).

In fact, this problem is exacerbated when the transcriptions are long (e.g., more than one hour) or when the transcription is interspersed with unimportant discussions (e.g., small talk). Due to the fact that users often lack the time or the patience to review the entire transcription (especially when it is long), the users often depend on the summaries generated by the conventional system. Nevertheless, since the summary of the transcription is unreliable due to covering a limited portion of the information in the transcription (as discuss previously), users would be better off taking time to read the transcription in its entirety to ensure that they recall or obtain accurate information.

Some aspects of the present disclosure address some or all of the issues noted above, among others, through use of the content summarization system, which generates an accurate summary of content. A user may wish to generate a summary of content. Such content may be in any form including (but not limited to), audio (e.g., lectures, meeting recordings, music, podcasts), images (e.g., photographs), video (e.g., TV series, and/or movies), text (e.g., textual information, articles, newspapers, books). Summary as used herein refers to a brief description of the main points of a content (as described above) that provides a reader with a comprehensive understanding of the content (without having to review the entirety of the content). In other words, the content summary is more succinct and is less in substance than the content itself. Further, the length of the content summary (e.g., number of words or sentences) is usually substantially less than the content itself.

Further, the content summarization system may also provide the user with the opportunity to tailor the summary according to one or more categorical descriptions (or subject matter), such as (but not limited to) topics, issues, outcomes, due dates, and action items. Topic, as used herein, may refer to themes (or the focus of attention) of a content. Issues, as used herein, may refer to a problem, a point in question or a matter that is in dispute. Outcomes, as used herein, may refer to decisions or conclusions that have been reached. Due dates (or deadlines), as used herein, may include dates by which certain actions should or must be performed. Action items, as used herein, may refer to tasks or assignments that are to be performed in the present or future. A content may include one or more of types of such categorical descriptions. Further, there may be more than one categorical description in a content (e.g., more than one topic in a conversation).

To facilitate generating of such summary, the user may first provide, to the content summarization system, the content (on which the user wishes to perform a summary) and a user request (that may be in a natural language format) which specifies how the content summary should be generated (e.g., "Could you please generate a summary based on action items?"). The content summarization system includes an encoding generator and a summary generator, each of which may include a language model or large language model (LLM). The content summarization system may perform multiple iterations of prompting the encoding generator and the summary generator to generate the content summary.

In case that the user request includes a request to generate a content summary that is tailored to one type of categorical description, the content summarization system may, for example, perform two iterations. In the first iteration, the encoding generator generates a first encoded output (which may be a soft prompt) based on the user request and tokens. Next, the first encoded output and the content is inputted into the summary generator, which generates a categorical description output. Such categorical description output includes one or more categorical descriptions identified in the content (e.g., action items: "finish creating spreadsheet," "meet with clients," "call accounting department," "make reservation at restaurant"). Next, the content summarization system performs the second iteration in which the categorical descriptions and tokens are inputted into the encoding generator, which in turns generates a second encoded output (which may also be a soft prompt). The second encoded output and the content are inputted into the summary generator, which generates the content summary.

As used herein, "input" should be understood to include a request comprising text in natural language form, structured text, images, video, a multimedia document, a presentation or part of a presentation, audio, video, code, content, or any other medium accepted as input by a model implemented in a content generation system. A prompt may be generated by a system implementing a model, may be received from a user, and/or retrieved from a data store storing previously generated or received prompts.

As used herein, "output" should be understood to include unstructured or structured text, software code, compiled software programs, video, audio, an image, a presentation slide, a presentation (e.g., a presentation comprising a plurality of multimedia slides and transition information between the slides), a spreadsheet, a database, data formatted according to a defined structure, an email, a location indicator pointing to a location where content is stored, or any other information type. Specific types of output may be used to aid in the descriptions of various aspects of the embodiments described herein, but such use of specific output types should be understood to be for the purpose of simplifying descriptions only and not to limit the description to the output type used.

The term "model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), and/or the like.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model ("LLM") is any type of language model that has been trained on a larger data set and has a larger number of training parameters compared to a regular language model. An LLM can understand more intricate patterns and generate text that is more coherent and contextually relevant due to its extensive training. Thus, an LLM may perform well on a wide range of topics and tasks. An LLM may comprise a NN trained using self-supervised learning. An LLM may be of any type, including a Question Answer ("QA") LLM that may be optimized for generating answers from a context, a multimodel LLM/model, and/or the like. An LLM (and/or other models of the present disclosure), may include, for example, attention-based and/or transformer architecture or functionality.

While certain aspects and implementations are discussed herein with reference to use of a language model, LLM, and/or AI, those aspects and implementations may be performed by any other language model, LLM, AI model, generative AI model, generative model, ML model, NN, multimodel model, and/or other algorithmic processes. Similarly, while certain aspects and implementations are discussed herein with reference to use of a ML model, those aspects and implementations may be performed by any other AI model, generative AI model, generative model, NN, multimodel model, and/or other algorithmic processes.

In various implementations, the LLMs and/or other models (including ML models) of the present disclosure may be locally hosted, cloud managed, accessed via one or more Application Programming Interfaces ("APIs"), and/or any combination of the foregoing and/or the like. Additionally, in various implementations, the LLMs and/or other models (including ML models) of the present disclosure may be implemented in or by electronic hardware such application-specific processors (e.g., application-specific integrated circuits ("ASICs")), programmable processors (e.g., field programmable gate arrays ("FPGAs")), application-specific circuitry, and/or the like. Data that may be queried using the systems and methods of the present disclosure may include any type of electronic data, such as text, files, documents, books, manuals, emails, images, audio, video, databases, metadata, positional data (e.g., geo-coordinates), geospatial data, sensor data, web pages, time series data, and/or any combination of the foregoing and/or the like. In various implementations, such data may comprise model inputs and/or outputs, model training data, modeled data, and/or the like.

Examples of models, language models, and/or LLMs that may be used in various implementations of the present disclosure include, for example, Bidirectional Encoder Representations from Transformers (BERT), LaMDA (Language Model for Dialogue Applications), PaLM (Pathways Language Model), PaLM 2 (Pathways Language Model 2), Generative Pre-trained Transformer 2 (GPT-2), Generative Pre-trained Transformer 3 (GPT-3), Generative Pre-trained Transformer 4 (GPT-4), LLAMA (Large Language Model Meta AI), and BigScience Large Open-science Open-access Multilingual Language Model (BLOOM).

The term "natural language" as used in the present disclosure, can include words from any languages used by humans including, but not limited to, Arabic, Chinese, English, French, Hindi, and/or Spanish. Further, natural language may also include words that have common nomenclature (e.g., names of people, places, organizations, brands, and/or products). In addition, natural language may also include one or more words arranged in a conversational format that is, for example, normally used between humans speaking to each other.

Various aspects of the disclosure will be described with regard to certain examples and embodiments, which are intended to illustrate but not limit the disclosure. Although aspects of some embodiments described in the disclosure will focus, for the purpose of illustration, on particular examples of content types, machine learning models, and the like, the examples are illustrative only and are not intended to be limiting. In some embodiments, the techniques described herein may be applied to additional or alternative types of content types, machine learning models, and the like. Additionally, any feature used in any embodiment described herein may be used in any combination with any other feature or in any other embodiment, without limitation.

Example Content Summarization Systems

With reference to an illustrative example, FIG. 1 shows a user system 105 in communication with a content summarization system 120. The user system 105 may be in communication with the content summarization system 120 over a network. The network may be the network 240 (described in further detail in relation to FIG. 2 below herein), the Internet, a local area network, a cellular network, or any other form of communication network. Alternatively, the content summarization system 120 and the user system 105 may be the same computing system.

The user system 105 is a computing device associated with a user of the content summarization system 120. The user system 105 is configured to receive a request comprising input information from the user. The input information may a natural language description (e.g., the user may describe an aspect of the input information in plain language). The description, in some embodiments, may be a formatted description, where the user system 105 processes the user input in plain language into a format accepted by, or more easily processed by, the content summarization system 120. In addition, the input information may also include content that is in a form of (but not limited to), audio information (e.g., lectures, meeting recordings, music, podcasts), image information (e.g., photographs), video information (e.g., TV series, and/or movies), text information (e.g., articles, newspapers, books) or any medium accepted as input by the content summarization system 120.

The content summarization system 120 comprises an interface subsystem 125, an encoding generator subsystem 130, a summary generator subsystem 135, and a language programming store 140. The interface subsystem 125 is configured to interact with the user system 105. In some embodiments the interface subsystem 125 may provide a user interface to the user via, for example, a web browser or an application. In other embodiments, the user interaction with the user interface may include using an input/output device (e.g., keyboard, mouse, microphone, and/or camera). More specifically, the user of the user system 105 may have content of which the user wishes to generate a summary. Such content may be in any form including (but not limited to), audio information (e.g., lectures, meeting recordings, music, podcasts), image information (e.g., photographs), video information (e.g., TV series, and/or movies), textual information (e.g., documents, articles, newspapers, books) or any medium accepted as input by the content summarization system.

In some embodiments, the content may include speech by a single person (e.g., university lecture), dialogue between two people (e.g., a journalist interviewing a politician), or a conversation among three or more people (e.g., a company meeting). In some embodiments, the content may be included in a content data structure. More specifically, the content data structure may include the content and additional data that is associated with the content. For example, the content data structure may be a video text track (VTT) file in which the content includes text (e.g., subtitles to a movie, a transcription of recording) and the additional data includes timing data (e.g., indicating when to display the subtitle or when each word, phrase, and/or sentence was spoken in the recording). An example of content is shown by content 602 in FIG. 6. The user may input such content into the content summarization system 120 via the interface subsystem 125. In some embodiments, the interface subsystem 125 may convert the content into a format that is processable by the summary generator subsystem 135. For example, audio meeting recordings, lyrics from music, or lines from a movie may be converted from an audio format into a written or text format.

In addition, the interface subsystem 125 may also be configured to receive a user request (or user prompt). For example, the user request may include a request to the content summarization system 120 to generate a content summary that is tailored to a particular categorical description of the content which includes (but is not limited to), topics, issues, outcomes, due dates, and action items, or other subject matter. In other words, the summarization performed by the content summarization system is not limited to a generic summary of the content, as users may have the option of tailoring the content summary according to their own preferences. The user request may be a discrete prompt, which is a prompt that is in the natural language format (e.g., "Could you please generate a summary of this transcription based on topics?"). It should be noted that the interface subsystem 125 may receive the prompt from the user in, for example, an audio format (e.g., via a microphone) or a written format (e.g., via text input).

The encoding generator subsystem 130 may include a least one of a language model and a large language model (LLM). In some embodiments, there may be two or more encoding generator subsystems 130 in the content summarization system 120. The encoding generator subsystem 130 may include a transformer encoder (or a soft-prompt generator) that generates encoded outputs (or soft prompts) that assists the summary generator in (1) classifying portions of the content into the categorical description requested in the user instruction (e.g., topics, issues, outcomes, or action items) and (2) generating a summary of the content based on the categorical description previously generated. The encoded outputs may be in a format that is processable by the summary generator subsystem 135. For example, the encoded outputs may be in a feature vector(s) or a matrix.

As discussed above, the encoding generator subsystem 130 may also include a soft-prompt generator, which generates the encoded output as soft prompts. Such soft prompts are provided to the summary generator subsystem 135. Soft prompts allow the summary generator subsystem 135 to accurately generate a summary regardless of the words, phrases, and/or sentences included in the user request or user prompt. More specifically, a non-soft prompt (e.g., a discrete prompt) may not always cause an LLM to generate an accurate summary. For example, a user may request a conventional LLM to generate a summary of an article that discusses historical sites in Paris. A first non-soft prompt ("Could you provide a brief summary of this article?") may correctly generate a summary of the article. However, a second non-soft prompt ("Could you provide a concise summary of this article?") may incorrectly generate a summary based on the history of Paris (instead of historical sites in Paris). As such, even though the first non-soft prompt and the second non-soft prompt differ only in one word ("concise"), the summaries generated are entirely different.

As such, soft prompts are capable of solving such issues encountered by non-soft prompts. More specifically, soft prompts involve incorporating vectors into an input sequence, and then fine-tuning these vectors. For example, the encoding generator may be trained to fine-tune such vectors by a training set including sample content, categorical descriptions of such sample content, and/or summaries of such content. Further, tokens may also assist in fine-tuning such vectors. Such tokens may include word embeddings which are representations of words in vector or matrix format. Words having similar or the same meaning occupy close spatial positions, while words having different meanings occupy a farther spatial position.

More specifically, as discussed previously, two prompts that are regarded as the same by a human (e.g., "Could you provide a brief summary of this article?" vs. "Could you provide a concise summary of this article?") may be interpreted entirely differently by an LLM. As such, the encoding generator subsystem 130 attempts to compensate this error via the word embeddings. More specifically, since the encoding generator subsystem 130 transforms the prompt into a vector or matrix format to generate the soft prompt, the encoding generator subsystem 130 uses the word embeddings to assist in calculating the numerical values in the vector or matrix format. As mentioned previously, the word embeddings represent words in vector or matrix format in which words that occupy the same or similar meaning are located spatially closer together. In other words, while two words may be interpreted differently in their natural language format by an LLM, the two words may be interpreted as the same in the vector format calculated using word embeddings by the same LLM.

Consequently, for example, the first non-soft prompt ("Could you provide a brief summary of this article?") and the second non-soft prompt ("Could you provide a concise summary of this article"?) may have similar vector or matrix when transformed into a soft prompt, thereby ensuring that the summary generator subsystem 135 is capable of understanding the intent in the soft prompt, which allows the generating of an accurate output. It should be noted that the encoding generator subsystem 130 may utilize both the tokens and the training (that it acquired from the training set including sample content, categorical descriptions of such sample content, and/or summaries of such content) to generate the soft prompt. In some embodiments, the soft prompt may be in a vector or matrix format, such that it is not processable by a human due to the fact that it is impossible for a human to understand how to modify the numerical values to obtain a specific result (e.g., changing zero to a one in a vector may result in an entirely different intention). In short, the modified input sequence (or soft prompt), defined by the fine-tuned vectors, guides the behavior of the summary generator subsystem 135 for a particular task (e.g., generating categorical descriptions and/or a summary of the content), such that the summary generator subsystem 135 generates a more accurate result when performing such task.

In some embodiments, the content summarization subsystem 120 may also cause a prompt (e.g., in natural language format), such as prompt 603 ("Identify the key topics in the transcription"), as shown in FIG. 6, to be inputted into the encoding generator subsystem 130 along with the tokens and/or the user request during the first iteration. The prompt 603 may, for example, include, be based on, or consist of the user request. In some embodiments, the prompt 603 may be generated based on the user request via the encoding generator subsystem 130 and/or the summary generator subsystem 135. As such, the prompt 603 may then be inputted into the encoding generator subsystem 130 (along with the tokens) instead of the user request. Alternatively, the prompt 603 may be one of a plurality of predetermined prompts stored in the content summarization subsystem 120, in which a predetermined prompt is selected based on the user request. In other embodiments, the content summarization subsystem 120 may also cause a prompt (e.g., in natural language format), such as prompt 605 ("Generate a summary based on the key topics"), as shown in FIG. 6, to be inputted into the encoding generator subsystem 130 along with the categorical description output and the tokens during the second iteration. For example, the prompt 605 may be generated based on the user request via the encoding generator subsystem 130 and/or the summary generator subsystem 135. In another example, the prompt 605 may be one of a plurality of predetermined prompts stored in the content summarization subsystem 120, in which a predetermined prompt is selected based on the user request.

The summary generator subsystem 135 may include a least one of a language model and a large language model (LLM). In some embodiments, there may be two or more summary generator subsystems 135 in the content summarization system 120. The summary generator subsystem 135 generates, based on the content provided by the user and the encoded outputs provided by the encoding generator subsystem 130, (1) a categorical description output (e.g., topics, issues, outcomes, or action items) and (2) a content summary tailored according to the categorical description output. An example of a categorical description output is shown by categorical description output 604 in FIG. 6 and an example of a content summary is shown by content summary 606 in FIG. 6. It should also be noted that the size of the language model (or LLM) included in the encoding generator subsystem 130 may be substantially less than the language model (or LLM) included in the summary generator subsystem 135. As such, it may be sufficient to fine-tune the encoding generator subsystem 130 (for generating soft prompts) without performing any fine-tuning on the summary generator subsystem 135, since fine-tuning a large-sized LLM may be extremely time consuming. In contrast, fine-tuning the encoding generator subsystem 130 to generate better soft prompts is not as time consuming due to the small size of the encoding generator subsystem 130.

In some embodiments, the content summarization system 120 comprises a large language model (LLM). The LLM may be stored in the language programming store 140 and requested by the at least one of the encoding generator subsystem 130 and the summary generator subsystem 135, when the LLM is needed. In some embodiments, the content summarization system 120 may request an LLM based on the type of content in the received request. For example, the language programming store 140 may store a plurality of LLMs, where an LLM is trained for, or fine-tuned to understand, and associated with generating a categorical description output and generating a content summary based on the categorical description. Alternatively, each system of the content summarization system 210 may share a common LLM stored in the language programming store 140.

FIG. 2 is a block diagram of illustrative data flows within an example system 200 for providing summarization of content. The system 200 comprises a computing device 205 associated with a user 250, a content summarization system 210 including a content summarization module 215, and a network 240.

The computing device 205 is any computing device (e.g., a laptop computing device, smartphone, terminal in communication with a server computing device, etc.) associated with a user 250 of the system 200. The computing device 205 is configured to receive a request from the user 250 and communicate such request to other components of the system 200 via the network 240. Additionally, the computing device 205 is configured to receive information, such as content, requests to generate a summary of such content based on categorical description, and/or instructions in a natural language format, or any other information, from other components of the system 200 via the network 240.

The content summarization system 210 is a computing device that includes a content summarization module 215 which provides content summarization services. For example, the content summarization module 215 may be an application with which the user interacts with using the computing device 205. The content summarization module 215 may communicate with other components of the system 200 according to protocols defined by the network 240. The content summarization module 215 may be configured to receive a user request. For example, the user request may include a request to generate a content summary that is tailored to a particular categorical description of the content which includes (but is not limited to), topics, issues, outcomes, and action items. The content summarization module 215 may have access to one or more language models or LLMs that allow the content summarization module 215 to generate the content summary according to the particular categorical description requested by the user.

The network 240 may be a publicly accessible network of linked networks, some or all of which may be operated by various distinct parties, for example the Internet. In some cases, network 240 may include a private network, personal area network, local area network, wide area network, cellular data network, satellite network, etc., or some combination thereof, some or all of which may or may not have access to and/or from the Internet.

Example Routines for Generating Categorical Descriptions

Figure 7:
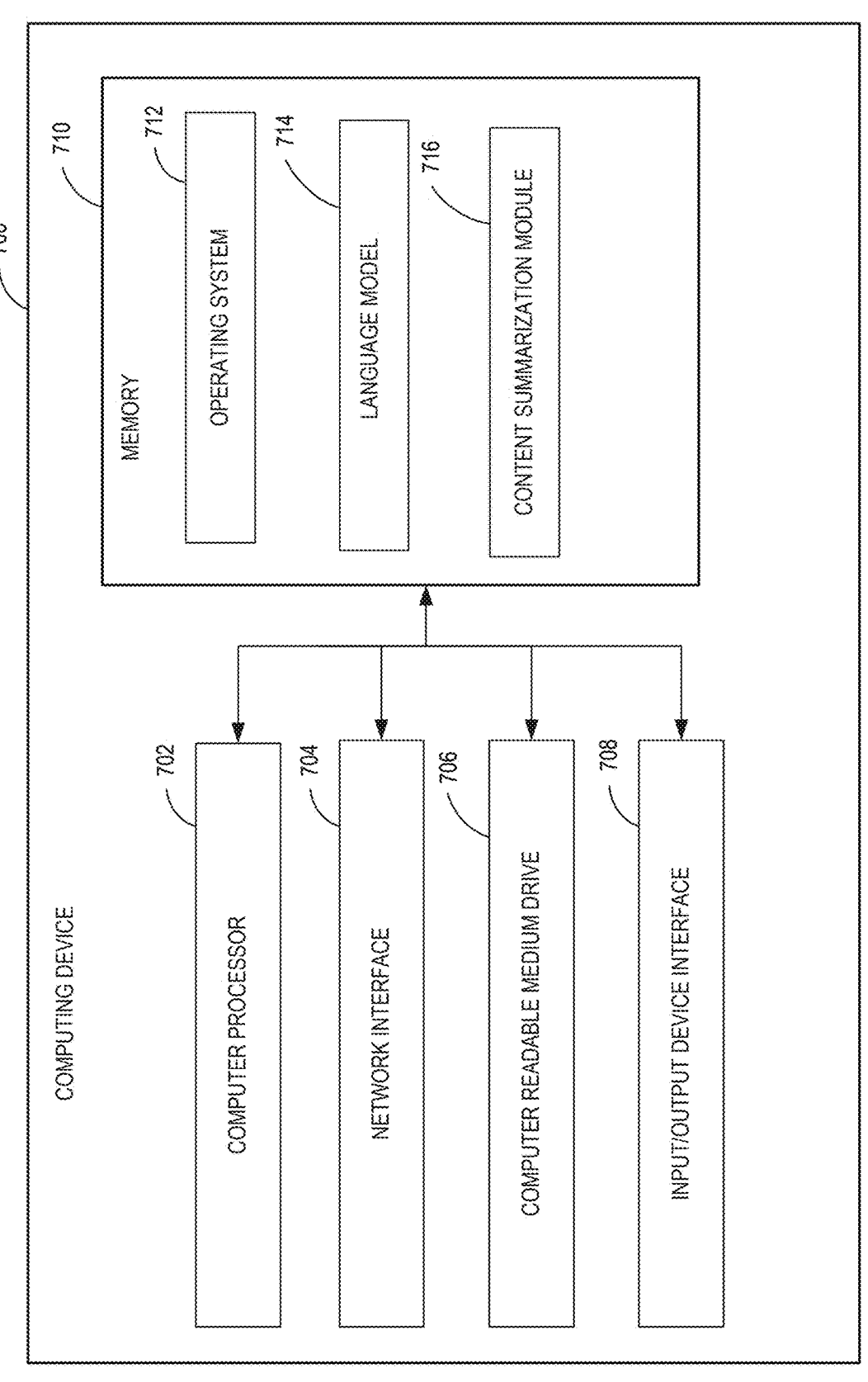
FIG. 7 is a block diagram of an illustrative computing system configured to provide a language programming interface, according to some embodiments.

When a routine described herein (i.e., routine 300, routine 400, and routine 500) is initiated, a set of executable program instructions stored on one or more non-transitory computer-readable media (e.g., hard drive, flash memory, removable media, etc.) may be loaded into memory (e.g., random access memory or RAM) of a computing device, such as the computing device 700 shown in FIG. 7, and executed by one or more processors. In some embodiments, the routine 300, routine 400 and routine 500, or portions thereof may be implemented on multiple processors, serially or in parallel.

FIG. 3 illustrates example routine 300 (beginning at block 302) for generating a categorical description output based on content and the user request that are received from a user system 105 or the computing device 205 associated with the user 250 (first iteration). At block 304, the interface subsystem 125 receives content 602 from the user system 105. The content 602 includes a transcript of a conversation among multiple team members discussing conducting presentations. However, as discussed above, the content may be in any form including (but not limited to), audio information (e.g., lectures, meeting recordings, music, podcasts), image (e.g., photographs), video information (e.g., TV series, and/or movies), text information (e.g., articles, newspapers, books) or any medium accepted as input by the content summarization system 120. At block 306, the interface subsystem 125 receives a user request that specifies an intent to generate a summary based on a categorical description specified by the user. The user request may be a discrete prompt, which is a prompt that is in the natural language format (e.g., "Could you please generate a summary of this team meeting transcription based on topics?"). In some embodiments, the user request may further specify that the summary be limited in length (e.g., "Could you please generate a summary of this dialogue that has less than 150 words?") or may specify the narrative (e.g., first person, second person, and/or third person) of the summary (e.g., "Could you please summarize this article using first person narrative?"). It should be noted that blocks 304 and 306 may be performed in any order or may be performed simultaneously.

At block 308, the user request and a first set of tokens are inputted into encoding generator subsystem 130. In some embodiments, the content summarization subsystem 120 may also cause a prompt (e.g., in natural language format), such as prompt 603 ("Identify the key topics in the transcription") to be inputted into the encoding generator subsystem 130 along with the tokens and/or the user request. Such prompt 603 may, for example, include, be based on, or consist of the user request. In some embodiments, the prompt 603 may be generated based on the user request via the encoding generator subsystem 130 and/or the summary generator subsystem 135. As such, the prompt 603 may then be inputted into the encoding generator subsystem 130 (along with the tokens) instead of the user request. Alternatively, the prompt 603 may be one of a plurality of predetermined prompts stored in the content summarization subsystem 120, in which a predetermined prompt is selected based on the user request. Like previously, the predetermined prompt may substitute the user request. As discussed previously, the encoding generator subsystem 130 may include a soft-prompt generator that is configured to generate an encoded output in the form of a soft prompt, which may provide refined instructions (based on the user request) to the summary generator subsystem 135 to generate the categorical description output and/or assists the summary generator subsystem 135 in classifying portions of the content 602 into the categorical description requested in the user instruction (e.g., topics, issues, outcomes, or action items). Soft prompts involve incorporating vectors into an input sequence, and then fine-tuning these vectors. Tokens may assist in fine-tuning such vectors. Such tokens may include word embeddings which are representations of words in vector or matrix format. Words having similar or the same meaning occupy close spatial positions, while words having different meanings occupy a farther spatial position. Consequently, as discussed previously, the first set of tokens allow the user requests (that may be interpreted incorrectly by the summary generator subsystem 135 when in natural language format) to be interpreted correctly when transformed into a soft prompt. In short, the modified input sequence (or soft prompt), defined by the fine-tuned vectors, causes the summary generator subsystem 135 to more accurately generate a categorical description output. In some embodiments, the first set of tokens may include different tokens based on the user request (e.g., may depend on the words in the user prompt). At block 310, the encoding generator subsystem 130 generates a first encoded output (or first soft prompt). As discussed previously, the first encoded output may be a feature vector(s) or a matrix.

At block 312, the first encoded output and the content 602 are inputted (e.g., as a prompt) into the summary generator subsystem 135. In some embodiments, the first encoded output is prepended to the content 602. In other words, the first encoded output is attached to the beginning of the data representing the content 602. In other embodiments, the encoding generator subsystem 130 may, after generating the first encoded input, transmit the first encoded output to the summary generator subsystem 135. As such, the transmission of the first encoded output causes the summary generator subsystem 135 to retrieve the content, which may be stored in memory or a database by, for example, the interface subsystem 125.

At block 314, the summary generator subsystem 135 generates a categorical description output 604 based on the first encoded output and the content 602. As shown by the example in FIG. 6, the categorical description output 604 includes multiple categorical descriptions related to topics. In other words, the summary generator subsystem 135 generated a list of topics that were identified in the content 602. It should be noted that in some embodiments the user is not presented with the categorical description output. In other embodiments, the user may be presented with the categorical description output and may be provided with the opportunity to request generation (e.g., modify the original user request) of a summary based on a portion of the categorical descriptions (e.g., generate a summary based on "control of a remote presentation."). In other words, the user may be permitted to select one or more of the categorical descriptions for generating the content summary. The routine ends at block 316.

Example Routines for Generating a Content Summary

When a routine described herein (i.e., routine 300, routine 400, and routine 500) is initiated, a set of executable program instructions stored on one or more non-transitory computer-readable media (e.g., hard drive, flash memory, removable media, etc.) may be loaded into memory (e.g., random access memory or RAM) of a computing device, such as the computing device 700 shown in FIG. 7, and executed by one or more processors. In some embodiments, the routine 300, routine 400, and routine 500, or portions thereof may be implemented on multiple processors, serially or in parallel.

FIG. 4 illustrates example routine 400 (beginning at block 402) for generating a content summary based on content (received from the user system 105 or the computing device 205 associated with the user 250) and a categorical description output (generated by the encoding generator subsystem 130 (second iteration). At block 404, the content 602 is retrieved. For example, the interface subsystem 125 may have stored the content 602 in memory or a database after receiving it from the user system 105 or computing device 205. Next, at block 406, the encoding generator subsystem 130 receives the categorical description output generated by the summary generator subsystem 135 (which was generated in a process illustrated by FIG. 3). It should be noted that blocks 404 and 406 may be performed in any order or may be performed simultaneously. Further, in some embodiments, the summary generator subsystem 135 may, after generating the categorical description output, transmit the categorical description output to the encoding generator subsystem 130. As such, the transmission of the categorical description output causes the encoding generator subsystem 130 to retrieve the content.

At block 408, the categorical description output and tokens are inputted into the encoding generator subsystem 130. In some embodiments, the content summarization subsystem 120 may also cause a prompt (e.g., in natural language format), such as prompt 605 ("Generate a summary based on the key topics") to be inputted into the encoding generator subsystem 130 along with the categorical description output and the tokens. For example, the prompt 605 may be generated based on the user request via the encoding generator subsystem 130 and/or the summary generator subsystem 135. In another example, the prompt 605 may be one of a plurality of predetermined prompts stored in the content summarization subsystem 120, in which a predetermined prompt is selected based on the user request. As discussed previously, the encoding generator subsystem 130 may include a soft-prompt generator that is configured to generate an encoded output in the form of a soft prompt. In this case, the soft prompt may provide refined instructions (based on the categorical description output) to the summary generator subsystem 135 to generate the content summary and/or assists the summary generator subsystem 135 in generating a content summary based on the categorical description output. Soft prompts involve incorporating vectors into an input sequence, and then fine-tuning these vectors. Like previously when generating the first encoded output, a second set of tokens may assist in fine-tuning such vectors. Such second set of tokens may include word embeddings which are representations of words in vector or matrix format. In some embodiments, the second set of tokens used in generating second encoded output are the same as the second set of tokens used in generating the first encoded output. In other embodiments, the second set of tokens used in generating the second encoded output are different form the second set of tokens used in generating the first encoded output. In yet other embodiments, the second set of tokens may include different tokens based on the categorical description output (e.g., may depend on the words in the categorical description output).

Consequently, as discussed previously, second set of tokens allow the categorical description output (that may be interpreted incorrectly by the summary generator subsystem 135 when in natural language format) to be interpreted correctly when transformed into a soft prompt. Since the categorical description output may also include categorical descriptions in a natural language format, the tokens may be used by the encoding generator subsystem 130 to ensure that the summary generator subsystem 135 interprets the categorical descriptions in the categorical description output correctly. In short, the modified input sequence (or soft prompt), defined by the fine-tuned vectors, causes the summary generator subsystem 135 to more accurately generate a content summary. At block 410, the encoding generator subsystem 130 generates a second encoded output (or second soft prompt). As discussed previously, the second encoded output may be a feature vector(s) or a matrix.

At block 412, the second encoded output and the content 602 are inputted (e.g., as a prompt) into the summary generator subsystem 135. In some embodiments, the second encoded output is prepended to the content 602. In other words, the second encoded output is attached to the beginning of the data representing the content 602. Further, in some embodiments, the encoding generator subsystem 130 may, after generating the second encoded output, transmit the second encoded output to the summary generator subsystem 135. As such, the transmission of the second encoded output causes the summary generator subsystem 135 to retrieve the content from, for example, memory or a database. At block 414, the summary generator subsystem 135 generates a content summary 606 based on the second encoded output and the content 602.

As shown by the example in FIG. 6, the content summary 606 is a condensed version of the content 602. In some embodiments, such as the example illustrated by FIG. 6, the content and the content summary are in different formats or narratives. For example, the content summary may be a transcription of a recording of a meeting in which additional data describes the timing of each spoken word, phrase, and/or sentence (e.g., a VTT format), while the content summary may be a simple text-based document without any additional data. For example, while the content 602 may be a dialogue among multiple team members (e.g., narrative in first-person), the content summary 606 may be a description (e.g., narrative in third person of the content 602 as opposed to reducing the number of sentences in the content 602. By generating a description (e.g., in third person), the content summary becomes easier to review (e.g., read) since there is a coherent progression in logic, while reducing the number of sentences in a dialogue may render the reduced dialogue difficult to read since some connecting sentences may be missing. In some other embodiments, the summary generator subsystem 135 may be instructed to limit the number of words in the content summary to less than or equal two hundred (200) or three hundred (300) words (as exceeding such limit may try the user's patience). After the content summary is generated, the summary generator subsystem 135 may transmit the content summary to the interface subsystem 125, which in turn transmits the content summary to the user system 105 or the computing device 205 associated with the user 25 via, for example, the network 240. The routine ends at block 416.

Example Routines for Generating a Content Summary Based on Multiple Categorical Descriptions When a routine described herein (i.e., routine 300, routine 400, and routine 500) is initiated, a set of executable program instructions stored on one or more non-transitory computer-readable media (e.g., hard drive, flash memory, removable media, etc.) may be loaded into memory (e.g., random access memory or RAM) of a computing device, such as the computing device 700 shown in FIG. 7, and executed by one or more processors. In some embodiments, the routine 300, routine 400, and routine 500, or portions thereof may be implemented on multiple processors, serially or in parallel.

FIG. 5 illustrates example routine 500 (beginning at block 502) for generating a categorical description output based on content and the user request that are received from a user system 105 or the computing device 205 associated with the user 250. At block 504, the interface subsystem 125 receives content from the user system 105. As discussed above, the content may be in any form including (but not limited to), audio information (e.g., lectures, meeting recordings, music, podcasts), video information (e.g., TV series, and/or movies), image information (e.g., photographs), text (e.g., documents, articles, newspapers, books) or any medium accepted as input by the content summarization system 120. In addition, the interface subsystem 125 also receives a user request to generate a summary based on two or more categorical descriptions specified by the user. In other words, the content summary may be generated based on two or more types of categorical descriptions (e.g., "Could you please generate a summary of this content based on issues and action items?").

The content summarization system 120 may perform multiple iterations to generate the content summary requested in the user request. More specifically, the content summarization system 120 may perform the routine 300, which illustrated in FIG. 3 for each type of categorical description in the user request. Thus, at block 506, the user request is divided based upon the categorical descriptions into a first divided user request (e.g., "Could you please generate a summary of this content based on issues") and a second divided user request ("Could you please generate a summary of this content based on action items?").

At block 508, a first categorical description output is generated based, at least in part, on the first divided user request and the content by performing the routine 300 of FIG. 3 (first iteration). Once the first categorical description output is generated, the routine moves to block 510. Similarly, the second categorical description output is generated based, at least in part, on the second divided user request and the content by performing the routine 300 of FIG. 3 (second iteration). In some embodiments, there may be two or more encoding subsystems 130 and two or more summary generator subsystem 135, which allows block 508 and block 510 to be performed simultaneously. At block 512, the summary generator subsystem 135 receives the first categorical description output and the second categorical description output from the encoding generator subsystem 130. In some embodiments, the encoding generator subsystem 130 may transmit to the summary generator subsystem 135, the first categorical description output and the second categorical description output as soon as both outputs are generated.

Next, the summary generator subsystem 135 performs the routine 400 of FIG. 4 with a slight variation (third iteration). First, the summary generator subsystem 135 may skip block 406, since it already has received the first categorical description output and the second categorical description output at block 512. At block 408, the summary generator subsystem 135 may input the content and both the first categorical description output and second categorical description output into encoding generator subsystem 130. At block 410, the second encoded output (or soft prompt) is generated based on the first categorical description output and second categorical description output as well as the tokens mentioned previously. At block 412, the second encoded output and the content is inputted into the summary generator subsystem 135 (e.g., the encoding generator subsystem 130 transmits the second encoded output to the summary generator subsystem 135). At block 514 (slightly modified from block 414), the summary generator subsystem 135 generates the content summary based on the content and the second encoded output. More specifically, such content summary is generated based on both the first categorical description and the second categorical description requested in the user request. In the example used above, the user request may have requested to generate a summary based on "issues" and "action items." Consequently, the content summary may include subject matter directed towards "issues" and "action items." After the content summary is generated, the summary generator subsystem 135 may transmit the content summary to the interface subsystem 125, which in turn transmits the content summary to the user system 105 or the computing device 205 associated with the user 25 via, for example, the network 240. At block 516, the routine ends.

Execution Environment

FIG. 7 illustrates various components of an example computing device 700 configured to implement various functionality described herein.

In some embodiments, the computing device 700 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the computing device 700 may be implemented as web services consumable via one or more communication networks. In further embodiments, the computing device 700 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a computing device 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SSDs"), flash drives, and/or other persistent non-transitory computer readable media; one or more input/output device interfaces 708; and one or more computer-readable memories 710, such as random access memory ("RAM") and/or other volatile non-transitory computer readable media.

The one or more computer-readable memories 710 may include computer program instructions that one or more computer processors 702 execute and/or data that the one or more computer processors 702 use in order to implement one or more embodiments. For example, the one or more computer-readable memories 710 can store an operating system 712 to provide general administration of the computing device 700. As another example, the one or more computer-readable memories 710 can store a (large) language model 714 for processing natural language input and generating natural language output. As another example, the one or more computer-readable memories 710 can store a content summarization model 716 for generating content summaries based on categorical descriptions.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a hardware processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software, which can be collectively referred to as computer-implemented methods. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
computer-readable memory storing a soft-prompt generator and a summary generator, wherein the soft-prompt generator includes a first language model, and the summary generator includes a second language model; and
one or more processors configured by executable instructions to:

receive, via user interaction with a user interface, a content data structure comprising content to be summarized and a user request to generate a summary of the content, wherein the user request specifies an intent to generate the summary based on a categorical description, and wherein the user request is in a natural language format;
generate, via the soft-prompt generator, a first soft prompt based on the user request and one or more tokens selected to configure the soft-prompt generator, wherein the first soft prompt is in a feature vector or matrix format configured for processing by the summary generator to cause the summary generator to generate an output based on the intent, and wherein the one or more tokens comprise word embeddings;
transmit the first soft prompt to the summary generator, wherein the first soft prompt is prepended to the content;
generate, via the summary generator, a categorical description output based on the first soft prompt and the content, wherein the categorical description output includes one or more categorical descriptions that are each in a natural language format;
transmit the categorical description output to the soft-prompt generator;
generate, via the soft-prompt generator, a second soft prompt based on the categorical description output and the one or more tokens, wherein the second soft prompt is in a feature vector or matrix format;
transmit the second soft prompt to the summary generator, wherein the second soft prompt is prepended to the content;
generate, via the summary generator, the summary based on the second soft prompt and the content; and
transmit the summary.

2. The system of claim 1, wherein the content comprises at least one of image information, textual information, audio information, video information, or other information.

3. The system of claim 1, wherein the one or more categorical descriptions comprise at least one of topics, issues, outcomes, action items, or other subject matter.

4. The system of claim 1, wherein the second language model is substantially larger than the first language model.

5. The system of claim 1, wherein the first language model is fine-tuned to generate soft prompts by a training set that includes at least one of a plurality of content items, a plurality of categorical descriptions, and a plurality of content summaries that correspond to the plurality of content items and the plurality of categorical descriptions.

6. A computer-implemented method comprising:
as implemented by a hardware processor configured to execute computer-executable instructions:
receiving, via user interaction with a user interface, content and a user request to generate a summary of the content, wherein the user request specifies an intent to generate the summary based on a categorical description, and wherein the user request is in a natural language format;
generating, via a first language model, a first encoded output based on the user request and a first set of tokens selected to configure the first language model, wherein the first encoded output is in a feature vector or matrix configured for processing by a second language model to cause the second language model to generate an output based on the intent, and wherein the first set of tokens comprise word embeddings generated based on the user request;

generating, via the second language model, a categorical description output based on the first encoded output and the content;

generating, via the first language model, a second encoded output based on the categorical description output and a second set of tokens selected to configure the first language model;

generating, via the second language model, the summary based on the second encoded output and the content; and transmitting the summary.

7. The computer-implemented method of claim 6, wherein the content includes one or more portions that are in a natural language format.

8. The computer-implemented method of claim 6, wherein the first set of tokens used to generate the first encoded output is different from the second set of tokens used to generate the second encoded output.

9. The computer-implemented method of claim 6, wherein at least one of first language model and the second language model is a large language model (LLM).

10. The computer-implemented method of claim 6, wherein the first encoded output is a soft prompt that is generated by fine-tuning the user request based, at least in part, on the first set of tokens, to allow the second language model to accurately generate the categorical description output.

11. The computer-implemented method of claim 6, wherein the second encoded output is a soft prompt that is generated by fine-tuning the categorical description output based, at least in part, on the second set of tokens, to allow the second language model to accurately generate the summary.

12. The computer-implemented method of claim 6, wherein at least one of the first encoded output and the second encoded output is in a feature vector or matrix format.

13. The computer-implemented method of claim 6, wherein at least one of the first encoded output and the second encoded output is in a format that is not processable by a human.

14. A system comprising computer-readable memory and one or more processors, wherein the system is configured to:

receive, via user interaction with a user interface, content and a user request to generate a summary of the content, wherein the user request specifies an intent to generate the summary based on a categorical description, and wherein the user request is in a natural language format;

generate, via a first language model, a first encoded output based on the user request and a first set of tokens selected to configure the first language model, wherein the first encoded output is in a feature vector or matrix configured for processing by a second language model to cause the second language model to generate an output based on the intent, and wherein the first set of tokens comprise word embeddings generated based on the user request;

generate, via the second language model, a categorical description output based on the first encoded output and the content;

generate, via the first language model, a second encoded output based on the categorical description output and a second set of tokens selected to configure the first language model; and generate, via the second language model, the summary based on the second encoded output and the content.

15. The system of claim 14, wherein the categorical description output includes multiple categorical descriptions identified in the content.

16. The system of claim 15, after the second language model generates the categorical description output, a user is permitted to select one or more of the multiple categorical descriptions, in which the second language model is configured to generate the summary based on one or more categorical descriptions selected by the user.

17. The system of claim 14, wherein a length of the summary is less than a length of the content.

18. The system of claim 14, wherein a number of words in the summary is limited to less than or equal to three hundred words.

19. The system of claim 14, wherein a format of the content is different from a format of the summary.

20. The system of claim 14, wherein a narrative in the content is in first person, and a narrative in the summary is in third person.

* * * * *